United States Patent
Zeng et al.

(10) Patent No.: US 10,204,425 B2
(45) Date of Patent: Feb. 12, 2019

(54) FAST ITERATIVE RECONSTRUCTION WITH ONE BACKPROJECTION AND NO FORWARD PROJECTION

(71) Applicant: Toshiba Medical Systems Corporation, Otawara-shi (JP)

(72) Inventors: Gengsheng Lawrence Zeng, Salt Lake City, UT (US); Qiulin Tang, Buffalo Grove, IL (US); Zhou Yu, Wilmette, IL (US)

(73) Assignee: Toshiba Medical Systems Corporation, Otawara-shi (JP)

( * ) Notice: Subject to any disclaimer, the term of this patent is extended or adjusted under 35 U.S.C. 154(b) by 0 days.

(21) Appl. No.: 15/224,283

(22) Filed: Jul. 29, 2016

(65) Prior Publication Data
US 2018/0033165 A1 Feb. 1, 2018

(51) Int. Cl.
*G06T 11/00* (2006.01)

(52) U.S. Cl.
CPC .......... *G06T 11/003* (2013.01); *G06T 11/006* (2013.01); *G06T 2207/10081* (2013.01); *G06T 2211/421* (2013.01); *G06T 2211/424* (2013.01)

(58) Field of Classification Search
None
See application file for complete search history.

(56) References Cited

U.S. PATENT DOCUMENTS

| 8,600,137 B2 | 12/2013 | Bruder et al. |
| 8,605,977 B2 | 12/2013 | Bruder et al. |
| 8,718,343 B2 | 5/2014 | Bruder et al. |
| 2016/0210762 A1* | 7/2016 | Fu .......... G06T 11/006 |

OTHER PUBLICATIONS

Kose, Kivanc, Volkan Cevher, and A. Enis Cetin. "Filtered variation method for denoising and sparse signal processing." Acoustics, Speech and Signal Processing (ICASSP), 2012 IEEE International Conference on. IEEE, 2012.*

L Zeng, Gengsheng. "A filtered backprojection algorithm with characteristics of the iterative Landweber algorithm." Medical physics 39.2 (2012): 603-607.*

(Continued)

*Primary Examiner* — Vu Le
*Assistant Examiner* — Tracy Mangialaschi
(74) *Attorney, Agent, or Firm* — Oblon, McClelland, Maier & Neustadt, L.L.P.

(57) ABSTRACT

A method and apparatus is provided to reconstruct a computed tomography image from projection data using windowed filtered back-projection (FBP) and using regularization constraints that can be quadratic or non-quadratic. The method emulates multiple Landweber iterations using a single windowed FBP operation and then iterates between imposing regularization constraints and a single windowed FBP operation. This windowed FBP operation is only performed once. The regularization constraints can be imposed using edge-preserving denoising methods, including, e.g., a Huber filter, a median filter, a bilateral filter, a guided filter, a non-local means filter, a total-variation minimization regularizer, other known regularizer, or an anisotropic diffusion filter. The entire procedure contains no forward projection and contains only one back-projection.

20 Claims, 3 Drawing Sheets

(56) References Cited

OTHER PUBLICATIONS

Zeng, Gengsheng L., and Alex Zamyatin. "A filtered backprojection algorithm with ray-by-ray noise weighting." Medical physics 40.3 (2013).*
He, Kaiming, Jian Sun, and Xiaoou Tang. "Guided image filtering." IEEE transactions on pattern analysis and machine intelligence 35.6 (2013): 1397-1409.*
Poludniowski, G., N. M. Allinson, and P. M. Evans. "Proton computed tomography reconstruction using a backprojection-then-filtering approach." Physics in Medicine & Biology 59.24 (2014): 7905.*
R. L. Stevenson, B. E. Schmitz, and E. J. Delp, "Discontinuity pre-serving regularization of inverse visual problems," *IEEE Trans. Syst., Man, Cybern.*, vol. 24, No. 3, pp. 455-469 (1994).
T. Huang, G. Yang, and G. Tang, "A fast two-dimensional median filtering algorithm," *IEEE Trans. Acoust., Speech, Signal Processing*, vol. 27, No. 1, pp. 13-18 (1979).
C. Tomasi and R. Manduchi, "Bilateral Filtering for Gray and Color Images," in *Proceedings of the 1998 IEEE International Conference on Computer Vision* (IEEE, Bombay, India, 1998).
K. He, J. Sun, and X. Tang, "Guided Image Filtering," *IEEE Transactions on Pattern Analysis and Machine Intelligence*, vol. 35, Issue 6, pp. 1397-1409 (2013).
Kaiming He et al, "Fast Guided Filter" (Submitted on May 5, 2015) Cornell University Library.
G. L. Zeng, "A filtered backprojection algorithm with characteristics of the iterative Landweber algorithm," *Med. Phys.*, vol. 39, pp. 603-607 (2012).
G. L. Zeng and A. Zamyatin, "A filtered backprojection algorithm with ray-by-ray noise weighting," *Med. Phys.* vol. 40, 031113; http://dx.doi.org/10.1118/1.4790696 (2013).
G. L. Zeng, Y. Li and A. Zamyatin, "Iterative total-variation reconstruction vs. weighted filtered-backprojection reconstruction with edge-preserving filtering," *Phys. Med. Biol.* vol. 58, pp. 3413-3431 (2013).

* cited by examiner

FAST ITERATIVE RECONSTRUCTION WITH ONE BACKPROJECTION AND NO FORWARD PROJECTION

FIELD

This disclosure relates to filtered back-projection methods implementing regularization constraints that can be quadratic or non-quadratic, and, more particularly, to filtered back-projection methods using a one-step method to perform multiple Landweber iterations.

BACKGROUND

X-ray computed tomography (CT) has found extensive clinical applications in cancer, heart, and brain imaging. As CT has been increasingly used for cancer screening and pediatric imaging, there has arisen a push to reduce the radiation dose of clinical CT scans to become as low as reasonably achievable. Thus, iterative image reconstruction has been playing a more significant role in CT imaging. Iterative image reconstruction algorithms, as compared with traditional analytical algorithms, are promising in reducing the radiation dose while improving the CT image quality.

In X-ray computed tomography (CT), iterative reconstruction can be used to generate images. While there are various iterative reconstruction (IR) methods, such as the algebraic reconstruction technique, one common IR method is optimizing the expression $$\min\{\|Ax-p\|_W^2 + \beta U(x)\}$$

to obtain the argument x that minimizes the expression. For example, in X-ray CT, A is the system matrix that represents X-ray trajectories (i.e., line integrals) along various rays from a source through an object OBJ to an X-ray detector (e.g., the X-ray transform corresponding to projections through the three-dimensional object OBJ onto a two-dimensional projection image p), p represents projection data for series of projection images taken at a various projection angles in a CT scan and corresponding (e.g., the projection data can be log-transform of the measured X-ray intensity at the X-ray detector), and x represents the reconstructed image of the X-ray attenuation of the object OBJ. The notation $\|g\|_W^2$ signifies a weighted inner product of the form $g^T W g$, wherein W is the weight matrix. For example, the weight matrix W can weigh the pixel values according to their noise statistics (e.g., the signal-to-noise ratio), in which case the weight matrix W is diagonal when the noise of each pixel is statistically independent. The data-matching term $\|Ax-p\|_W^2$ is minimized when the forward projection A of the reconstructed image x provides a good approximation to all measured projection images p. In the above expression, U(x) is a regularization term, and β is a regularization parameter that weights the relative contributions of the data-matching term and the regularization term.

IR methods augmented with regularization can have several advantages over other reconstruction methods such as filtered back-projection. For example, IR methods augmented with regularization can produce high-quality reconstructions for few-view projection data and in the presence of significant noise. For few-view, limited-angle, and noisy projection scenarios, the application of regularization operators between reconstruction iterations seeks to tune the final and/or intermediate results to some a priori model. For example, enforcing positivity for the attenuation coefficients can provide a level of regularization based on the practical assumption that there are no regions in the object OBJ that cause an increase (i.e., gain) in the intensity of the X-ray radiation.

Other regularization terms can similarly rely on a priori knowledge of characteristics or constraints imposed on the reconstructed image. For example, minimizing the "total variation" (TV) in conjunction with projection on convex sets (POCS) is also a very popular regularization scheme. The TV-minimization algorithm assumes that the image is predominantly uniform over large regions with sharp transitions at the boundaries of the uniform regions, which is generally true for an image of a discrete number of organs, each with an approximately constant X-ray absorption coefficient (e.g., bone having a first absorption coefficient, the lungs having second coefficient, and the heart having a third coefficient). When the a priori model corresponds well to the image object OBJ, these regularized IR algorithms can produce impressive images, even though the reconstruction problem is significantly underdetermined (e.g., few-view scenarios), missing projection angles, or noisy. One advantage of using regularization is the flexibility of selecting from a wide range of regularization constraints.

A challenge of regularized IR algorithms is that they can require significantly more computational resources than filtered back-projection methods, often taking several hours to reach convergence for clinical CT scans using standard computing hardware. For certain quadratic regularizers, a one-step filtered back-projection algorithm can be used to reconstruct the reconstructed image of the Landweber algorithm for IR. This one-step filtered back-projection algorithm has the benefit of obtaining the result of the iterative Landweber algorithm, but much more quickly than performing IR. While the one-step filtered back-projection algorithm works for IR using a quadratic regularizer, no similar method is known to achieve the results of IR using FBP and a non-quadratic regularizer. Non-quadratic regularizers are known to advantageously achieve high levels of noise reduction while maintaining sharp edges in the reconstructed image. Further, non-quadratic regularizers can help achieve artifact suppression and better image quality than quadratic regularizers.

BRIEF DESCRIPTION OF THE DRAWINGS

A more complete understanding of this disclosure is provided by reference to the following detailed description when considered in connection with the accompanying drawings, wherein.

DETAILED DESCRIPTION

Figure 1:
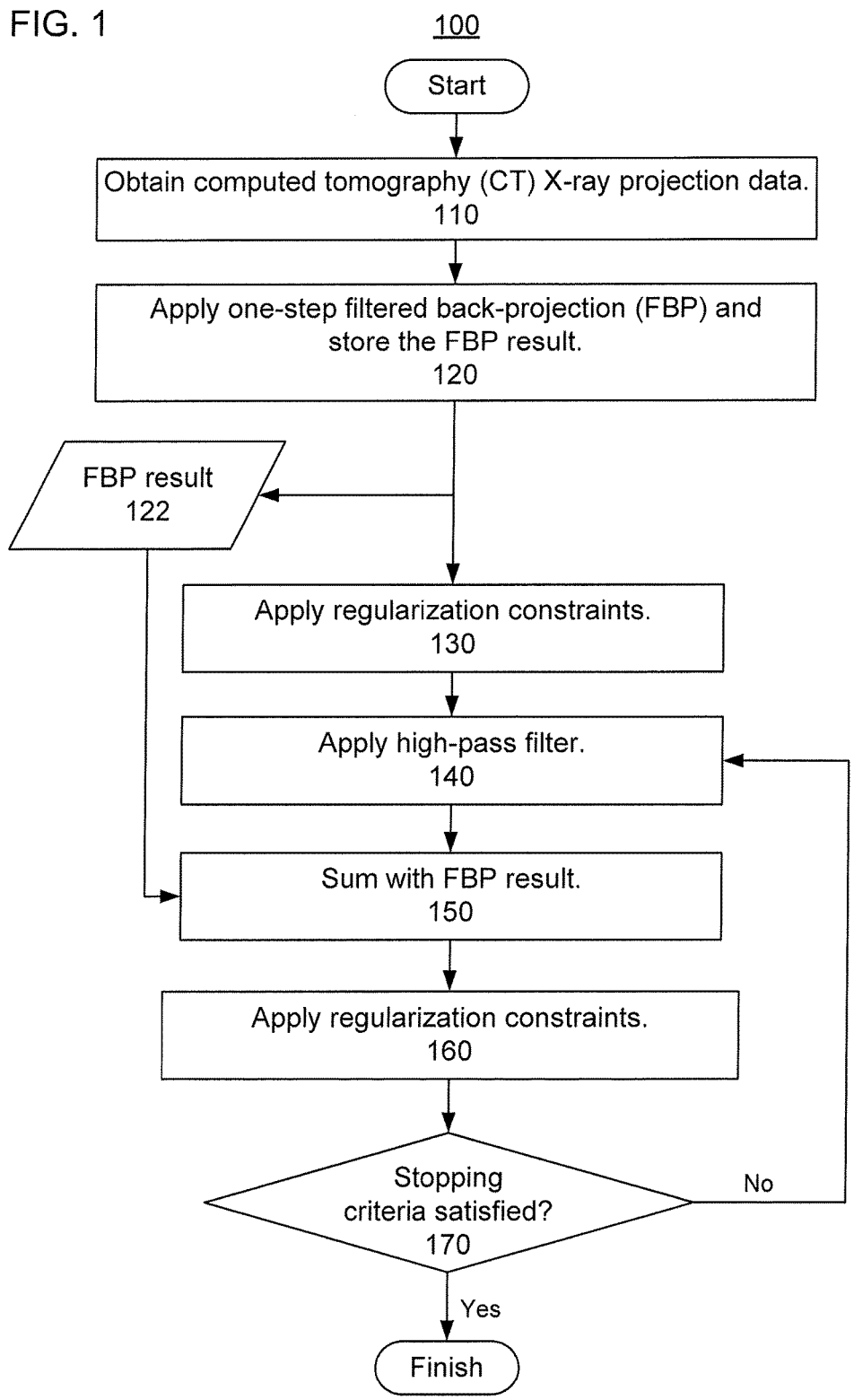
FIG. 1 shows a flow diagram of a two-input filtered back-projection method approximating iterative reconstruction using non-quadratic regularization constraints, according to one implementation.

Computed tomography image reconstruction is confronted with two competing objectives: reconstructing an image of high quality, and doing so efficiently (i.e., minimizing the computational resources required). Generally, filtered back-projection (FBP) methods excel at being highly computationally efficient but produce images of lower quality (e.g., streaky and noisy images), whereas iterative reconstruction (IR) methods excel at generating high quality images but require significant computational resources. The methods described herein achieve both better image quality than conventional FBP methods and better computational efficiency than conventional IR methods. These advantageous results are achieved using a two-input method with regularization constraints that is adapted from a single-step FBP based on the iterative Landweber reconstruction.

The Landweber algorithm is an iterative method to recover an image x from projection p, by solving a system of linear equation, p=Ax, for a linear operator A (i.e., a matrix when the problem is in finite dimensions). When A is nonsingular, then an explicit solution is $x=A^{-1}p$. However, if A is ill-conditioned, the explicit solution is a poor choice since it is sensitive to noise and errors in the projection data p. If A is singular, this explicit solution doesn't even exist. The Landweber algorithm provides a more robust method of solving the system matric equation by using an iterative method to minimize the quadratic objective function by solving $$\min_x \{\|Ax-p\|^2 + \beta x^T Rx\},$$

wherein $\|\cdot\|$ denotes a $l_2$-norm.

In the context of tomography, A is the projection matrix, x is the image array written as a column vector, p is the projection data written as a column vector, and β is a relative weighting factor, called the regularization factor, that adjusts the importance of the regularization term $x^T Rx$ relative to the data fidelity term $\|Ax-p\|^2$. The square matrix R is used to enforce some smoothness of the image so that the reconstruction is not too sensitive to noise. One way to promote the smoothness is to suppress the difference between the central pixel value and its neighbors. A Laplace operator that is the second-order derivative, for example, can be used in the matrix R.

The Landweber algorithm minimizes the objective function by iteratively solving the update equation $$x^{(k+1)}=x^{(k)}-\alpha\{A^T(Ax^{(k)}-p)+\beta x^T Rx\},$$

wherein $x^{(k)}$ is the $k^{th}$ iteration of the reconstructed image, a is a relation term that can be selected as a predefined value satisfying $0<\alpha<2/\lambda_1^2$, $\lambda_1$ is the largest singular value of the matrix A, and $A^T$ is the transpose of the matrix A and is the back-projection operator, just like A is the forward-projection operator.

As discussed in U.S. Pat. No. 8,908,942, incorporated herein by reference in its entirety, the Landweber algorithm for the $k^{th}$ iteration can be rewritten as $$x^{(k)}=(A^TA)^{-1}[I-(I-\alpha A^TA-\alpha\beta R)^k]A^Tp+(I-\alpha A^TA-\alpha\beta R)^k x^{(0)}.$$

By defining $$H^{(k)}\equiv(I-\alpha A^TA-\alpha\beta R)^k, \text{ and}$$

$$F^{(k)}=(A^TA+\beta R)^{-1}[I-(I-\alpha A^TA-\alpha\beta R)^k]$$

the Landweber algorithm for the $k^{th}$ iteration can be simplified as $$x^{(k)}=F^{(k)}A^Tp+H^{(k)}x^{(0)},$$

such that $k^{th}$ iteration of the reconstructed image depends directly on the original projection data and an initial estimate $x^{(0)}$ of the reconstructed image. If the initial image $x^{(0)}$ is set to zero, the above expression simplifies to the case considered in U.S. Pat. No. 8,908,942. However, for the methods discussed herein, $x^{(0)}$ is assumed to be non-zero. Further, the methods herein also periodically apply an edge-preserving denoising method between iterations of the Landweber algorithm, as discussed below.

If the regularization parameter β is set to zero, then $x^{(k)}=F^{(k)}A^Tp=A^TF_{(k)}p$ is equivalent to an FBP using a windowed ramp filter.

For a two-dimensional slice of a reconstructed image, forward projecting and then back-projecting as expressed by the operator $A^TA$ is equivalent to filtering the image with a transfer function $|\omega|^{-1}$. Likewise, multiplying an image by $(A^TA)^{-1}$ is equivalent to filtering the image with a transfer function $|\omega|$. Further, multiplying an image with an identity matrix I does nothing to the image. In the Fourier domain, this is equivalent to filtering the image with a transfer function having a constant value of unity. Accordingly, multiplying an image by $(I-\alpha A^TA)$ is equivalent to filtering the image with a transfer function $(1-\alpha/|\omega|)$. Additionally, multiplying an image by $(I-\alpha A^TA)^k$ is equivalent to filtering the image with a transfer function $(1-\alpha/|\omega|)$ k times, which is the same as filtering the image with a transfer function $(1-\alpha/|\omega|)^k$. Multiplying an image by $I-(I-\alpha A^TA)^k$ is equivalent to filtering the image with a transfer function $1-(1-\alpha/|\omega|)^k$. Thus, in the spatial-frequency domain, the above-identified terms can be represented as transfer functions. The frequency-domain equivalent transfer function for $H^{(k)}$ is $(1-\alpha/|\omega|)^k$, and the frequency-domain equivalent transfer function for $F^{(k)}$ is $|\omega|[1-(1-\alpha/|\omega|)^k]$.

Next, to achieve the denoising/smoothing of regularization while preserving sharp edges in the reconstructed image, an edge-preserving denoising method can be periodically inserted between Landweber iterations. Without the edge-preserving denoising method Landweber iterations can be performed with a one-step FBP operation, which is given by $$x^{(k)}=F^{(k)}A^Tp=A^TF^{(k)}p,$$

in which $x^{(0)}$ is set to zero. The order of back-projection and filtration can be changed.

The edge-preserving denoising method is denoted using an operator E. Here the letter "E" is not the notation for "expected value" used in probability and statistics. When the edge-preserving denoising operation E interspersed between every k Landweber iterations, the method can be expressed as $$x^{(k)}=E[A^TF^{(k)}p], \text{ and}$$

$$x^{(k(n+1))}=E[A^TF^{(k)}p+H^{(k)}x^{(kn)}], \text{ for } n=1,2,\ldots,N-1.$$

This algorithm is an approximation to kN Landweber iterations with an edge-preserving denoising constraint. Periodically applying the edge-preserving denoising operation E between the Landweber iterations has the advantageous effect that the constraints imposed by the edge-preserving denoising operation E are solved together with the iterations on the data-fidelity term, making the two-input method (the two inputs being projection data p and the initial image) a closer approximation to IR methods that minimize an objective function that include both a data-fidelity and regularization terms. The edge-preserving denoising operation E can be any edge-preserving denoising operation—quadratic or non-quadratic—whereas the regularization term $\beta x^T Rx$ is limited to quadratic regularization.

In many applications, the use of IR algorithms is desirable because IR algorithms are so versatile. For example, IR algorithms can have non-quadratic constraints, and most edge-preserving constraints are non-quadratic. FBP algorithms are linear algorithms, and accordingly, FBP algorithms solve linear equations. If the objective function is quadratic, the gradient of the objective function is linear. By setting the gradients to zero, a set of linear equations are obtained and can be solved. However, the same is not true when the objective function is non-quadratic. By breaking up the FBP algorithm for Landweber iterations into sections of k iterations and applying non-quadratic constraints using the edge-preserving denoising operation E, the benefits of non-quadratic constraints can be realized together with the computational efficiency of the one-step FBP algorithm for Landweber iterations.

Referring now to the drawings, wherein like reference numerals designate identical or corresponding parts throughout the several views, FIG. 1 shows a flow diagram of one implementation of method 100 to perform a two-input iterative FBP with interspersed regularization constraints.

In step 110 of method 100, computed tomography (CT) projection data is obtained, e.g., either from performing a CT scan or by recalling previously stored projection data from memory.

In step 120 of method 100, a one-step FBP method is performed on the projection data to generate an initial reconstructed image. For example, the one-step FBP method can be the one-step FBP method that is equivalent to k Landweber iterations, which is given by $$x^{(k)} = A^T F^{(k)} p.$$

Next, the result of the one-step FBP method is stored in memory, which is shown as FBP result 122. Thus, method 100 only performs one FBP operation, greatly reducing the computational burden of method 100 relative to IR methods that use one or more forward-projectors and back-projectors per iteration.

In step 130 of method 100, the regularization constraints are applied to the reconstructed image. For example, the regularization constraints can be applied to the reconstructed image by performing a denoising edge-preserving method to the reconstructed image. The denoising edge-preserving method can be any known method, including: a Huber filter, a median filter, a bilateral filter, a guided filter, a non-local means filter, a total-variation minimization regularizer, other known regularizer, an anisotropic diffusion filter, a or any other known denoising method.

In step 140 of method 100, a high-pass filter is applied to the reconstructed image. For example, the high-pass filter can be a high-pass filter as defined by $H^{(k)}$. The purpose of this special high-pass filter is to properly handle the initial image.

In step 150 of method 100, the high-passed image is summed with FBP result 122.

In step 160 of method 100, the regularization constraints are applied to the result of step 150. The regularization constraints can be applied by performing a denoising edge-preserving method to the reconstructed image. The denoising edge-preserving method can be any known method, including: a Huber filter, a median filter, a bilateral filter, a guided filter, a non-local means filter, a total-variation minimization regularizer, other known regularizer, an anisotropic diffusion filter, or any other known denoising method.

In step 170 of method 100, an inquiry is made as to whether the stopping criteria have been satisfied. The stopping criteria can include, e.g., a convergence criterion (e.g., whether the percentage change between the current and previous iterations is less than a predefined threshold) and/or a number of iterations criterion (e.g., whether a maximum number of iterations has been reached). If the stopping criteria have been satisfied, method 100 is complete and the result from step 160 is output. Otherwise, the method repeats steps 140-160.

Thus, a fast iterative algorithm can be realized that has a non-quadratic regularization constraint, such as edge-preserving denoising. Further, this windowed FBP algorithm is not the conventional FBP algorithm; but, for each loop, is equivalent to k iterations of an iterative Landweber algorithm, where k can be any positive integer. The non-linear filter can be an edge-preserving noise-smoothing filter (e.g., Huber), a median filter, a bilateral filter, a guided filter, etc. Additionally, in certain applications, the regularization constraint can be taken a step further to make it edge-enhancing, rather than just edge preserving. Regardless of the number of iterations of the loop corresponding to steps 140-160, only one backprojection is needed and no forward projections are required.

Figure 2:
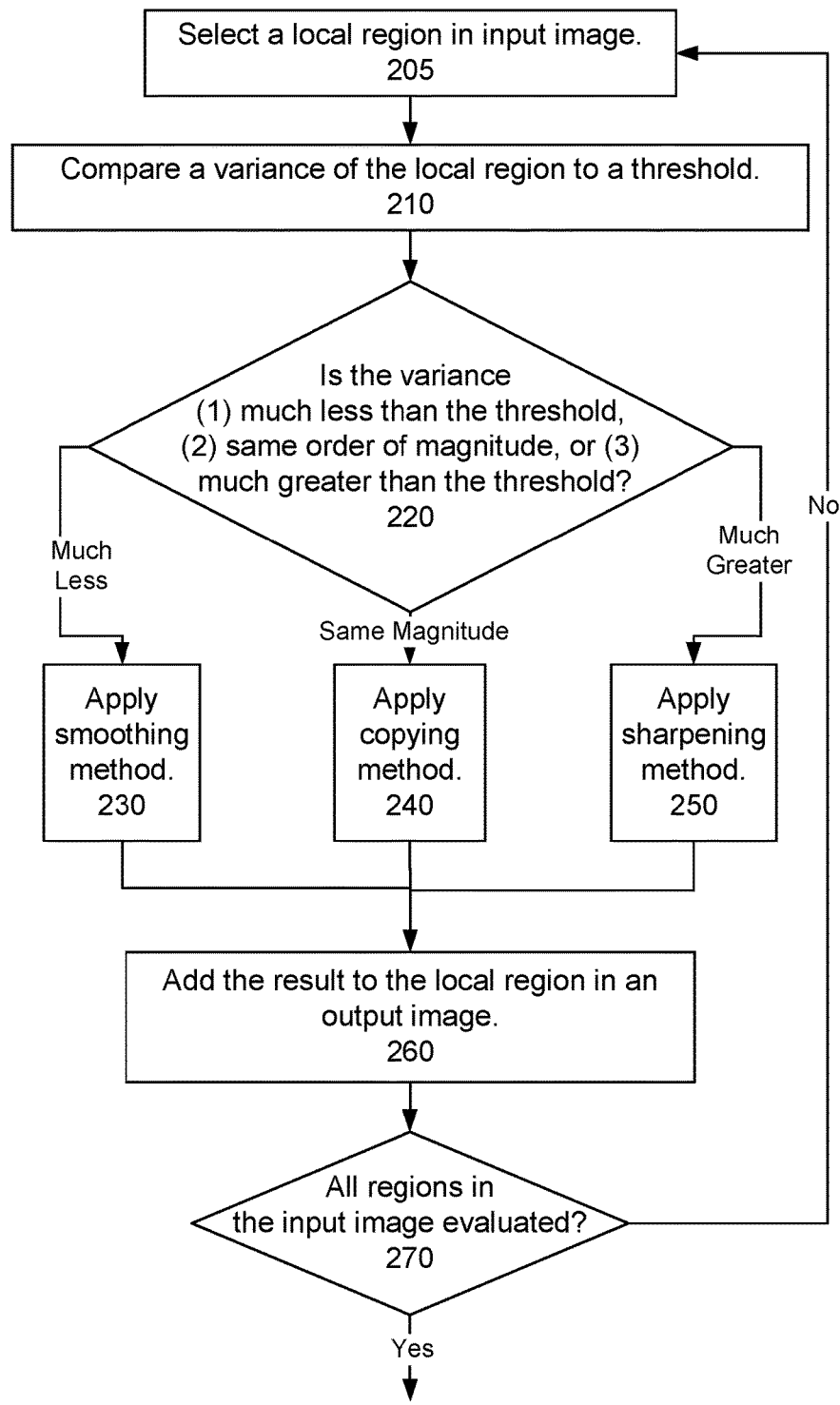
FIG. 2 shows a flow diagram of a method implementing regularization constraints according to one implementation.

Next, an edge-preserving method 200, shown in FIG. 2, is described. Method 200 is one of many examples of edge-preserving denoising methods. Method 200 uses a guided filter as the edge preserving denoising method E. The guided filter has the input/output relationship, which is given by $$x_i^{(output)} = \bar{a}_j x_i^{(input)} + \bar{b}_j$$

for a pixel i in the local region centered at pixel j, wherein $$a_j = \frac{\sigma_j^2}{\sigma_j^2 + \grave{o}},$$

$$b_j = \mu_j(1 - a_j),$$

$x_i^{(input)}$ is the ith pixel of the un-processed image, $x_i^{(output)}$ is the ith pixel of the processed image, $\mu_j$ is the local mean value of the input image in a local region centered at pixel j, $\sigma_j$ is the local variance of the input image in a local region centered at pixel j, $\bar{a}_j$ is the average value of $a_j$ in the local region, $\bar{b}_j$ is the average value of $b_j$ in the local region, and ò is a predefined threshold.

In certain implementations, the value $b_j$ is instead defined as $$b_j = \mu_j(1 - \gamma a_j),$$

wherein γ is a control parameter that is greater than one. This implementation is referred to as the modified guided filter.

The guided filter behaves differently depending on the relative magnitudes of variance $\sigma_j$ and the predefined threshold ò. The behavior of the guided filter can roughly be divided into three different cases, which are discussed next. These three cases correspond to the three cases considered in step 220 leading respectively to steps 230, 240, and 250.

As shown in FIG. 2, step 205 determines a region centered at pixel j.

Next, step 210 of method 200 determines the above-identified quantities for the region centered at pixel j in order to compare the relative magnitudes between variance $\sigma_j$ and the predefined threshold ε, which determines how the region is denoised.

In step 220 of method 200, the type of denoising is determined based on whether the variance is much less than the threshold, of the same order of magnitude as the threshold, or is much greater than the threshold. If the variance is much less than the threshold, then the region is denoised such that the guided filter approximates a smoothing method in step 230. If the variance is of the same order of magnitude as the threshold, then the region is denoised such that the guided filter approximates a half smoothing and half copying method in step 240. If the variance is much greater than the threshold, then the region is denoised such that the guided filter approximates a sharpening method in step 250.

In step 230 of method 200, the variance is much less than the threshold such that, $\sigma_j^2 \ll \epsilon$, $a_j \approx 0$, $b_j \approx \mu_j$, and $x_i^{(output)} \approx \mu_j$. In this case the guided filter operates in the smoothing mode to low-pass filter the image, and modified guided filter is almost the same as the original guided filter.

In step 240 of method 200, the variance is of the same order of magnitude as the threshold such that $\sigma_j^2 \approx \epsilon$, $a_j \approx \frac{1}{2}$, $b_j \approx \mu_j/2$, and $x_i^{(output)} = (x_i^{(input)} + \mu_j)/2$. Thus, in this case, the guided filter operates in the half smoothing and half copying mode, and the modified guided filter is almost the same as the original guided filter.

In step 250 of method 200, the variance is much greater than the threshold such that $\sigma_j^2 \gg \epsilon$, $a_j \approx 1$, $b_j \approx -\delta\mu_j$, and $x_i^{(output)} \approx x_i^{(input)} - \delta\mu_j$, wherein $\delta$ is a small positive number. This modified guided filter operates in the high-pass filtering mode, and actually enhances the edges.

In certain implementations, the power used in the definitions of $a_j$ and $b_j$ can be modified to make a sharper transition between the three above-identified cases corresponding to steps 230, 240, and 250 respectively. For example, the term $a_j$ can be defined as $$a_j = \frac{\sigma_j^2}{\sigma_j^4 + \varepsilon}, \text{ or}$$

$$a_j = \left(\frac{\sigma_j^2}{\sigma_j^2 + \varepsilon}\right)^{1.5}$$

and the like.

In step 260 of method 200, the results from steps 230, 240, and 250 are added to the respective local region in an output image. In step 270 of method 200, all regions are evaluated to determine whether stopping criteria have been reached, in which case method 200 is stopped. Otherwise, method 200 proceeds by returning to step 205.

Figure 3:
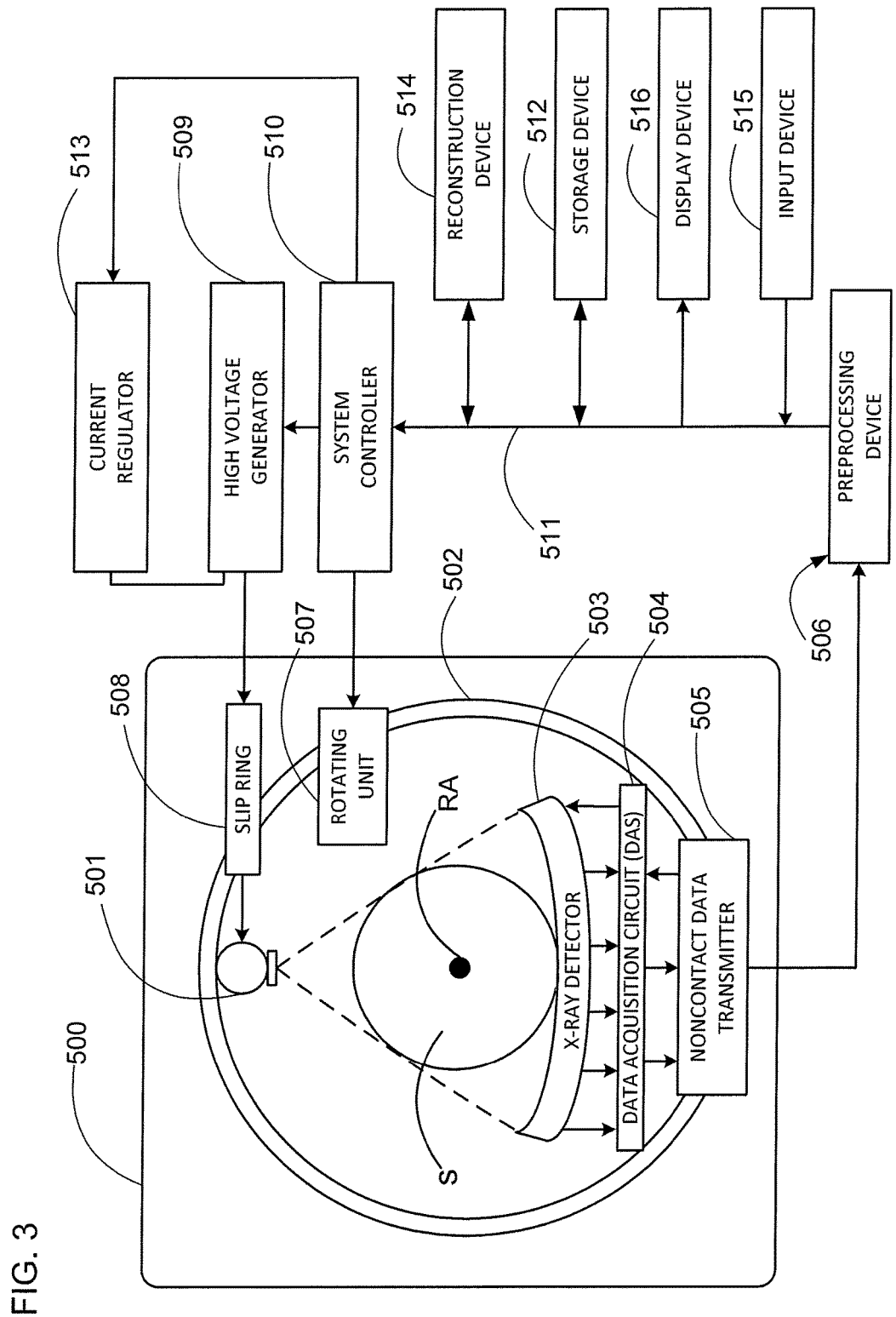
FIG. 3 shows a schematic of an implementation of a CT scanner, according to one implementation.

FIG. 3 illustrates an implementation of the radiography gantry included in a CT apparatus or scanner. As shown in FIG. 3, a radiography gantry 500 is illustrated from a side view and further includes an X-ray tube 501, an annular frame 502, and a multi-row or two-dimensional-array-type X-ray detector 503. The X-ray tube 501 and X-ray detector 503 are diametrically mounted across an object OBJ on the annular frame 502, which is rotatably supported around a rotation axis RA. A rotating unit 507 rotates the annular frame 502 at a high speed, such as 0.4 sec/rotation, while the object OBJ is being moved along the axis RA into or out of the illustrated page.

The first embodiment of an X-ray computed tomography (CT) apparatus according to the present inventions will be described below with reference to the views of the accompanying drawing. Note that X-ray CT apparatuses include various types of apparatuses, e.g., a rotate/rotate-type apparatus in which an X-ray tube and X-ray detector rotate together around an object to be examined, and a stationary/rotate-type apparatus in which many detection elements are arrayed in the form of a ring or plane, and only an X-ray tube rotates around an object to be examined. The present inventions can be applied to either type. In this case, the rotate/rotate type, which is currently the mainstream, will be exemplified.

The multi-slice X-ray CT apparatus further includes a high voltage generator 509 that generates a tube voltage applied to the X-ray tube 501 through a slip ring 508 so that the X-ray tube 501 generates X-rays. The X-rays are emitted towards the object OBJ, whose cross sectional area is represented by a circle. For example, the X-ray tube 501 having an average X-ray energy during a first scan that is less than an average X-ray energy during a second scan. Thus, two or more scans can be obtained corresponding to different X-ray energies. The X-ray detector 503 is located at an opposite side from the X-ray tube 501 across the object OBJ for detecting the emitted X-rays that have transmitted through the object OBJ. The X-ray detector 503 further includes individual detector elements or units.

The CT apparatus further includes other devices for processing the detected signals from X-ray detector 503. A data acquisition circuit or a Data Acquisition System (DAS) 504 converts a signal output from the X-ray detector 503 for each channel into a voltage signal, amplifies the signal, and further converts the signal into a digital signal. The X-ray detector 503 and the DAS 504 are configured to handle a predetermined total number of projections per rotation (TPPR).

The above-described data is sent to a preprocessing device 506, which is housed in a console outside the radiography gantry 500 through a non-contact data transmitter 505. The preprocessing device 506 performs certain corrections, such as sensitivity correction on the raw data. A memory 512 stores the resultant data, which is also called projection data at a stage immediately before reconstruction processing. The memory 512 is connected to a system controller 510 through a data/control bus 511, together with a reconstruction device 514, input device 515, and display 516. The system controller 510 controls a current regulator 513 that limits the current to a level sufficient for driving the CT system.

The detectors are rotated and/or fixed with respect to the patient among various generations of the CT scanner systems. In one implementation, the above-described CT system can be an example of a combined third-generation geometry and fourth-generation geometry system. In the third-generation system, the X-ray tube 501 and the X-ray detector 503 are diametrically mounted on the annular frame 502 and are rotated around the object OBJ as the annular frame 502 is rotated about the rotation axis RA. In the fourth-generation geometry system, the detectors are fixedly placed around the patient and an X-ray tube rotates around the patient. In an alternative embodiment, the radiography gantry 500 has multiple detectors arranged on the annular frame 502, which is supported by a C-arm and a stand.

The memory 512 can store the measurement value representative of the irradiance of the X-rays at the X-ray detector unit 503. Further, the memory 512 can store a dedicated program for executing the CT image reconstruction, material decomposition, and scatter estimation and corrections methods, including method 100 and method 200 discussed herein.

The reconstruction device 514 can execute the method 100 and the method 200 discussed herein. Further, reconstruction device 514 can execute pre-reconstruction processing image processing such as volume rendering processing and image difference processing as needed.

The pre-reconstruction processing of the projection data performed by the preprocessing device 506 can include correcting for detector calibrations, detector nonlinearities, and polar effects, for example.

Post-reconstruction processing performed by the reconstruction device 514 can include filtering and smoothing the image, volume rendering processing, and image difference processing as needed. The image reconstruction process can be performed using filtered back-projection, e.g., the two-input FBP of method 100. Further, method 100 can use method 200 for performing the regularization constraints. The reconstruction device 514 can use the memory to store, e.g., projection data, reconstructed images, calibration data and parameters, and computer programs.

The reconstruction device 514 can include a CPU (processing circuitry) that can be implemented as discrete logic gates, as an Application Specific Integrated Circuit (ASIC), a Field Programmable Gate Array (FPGA) or other Complex Programmable Logic Device (CPLD). An FPGA or CPLD implementation may be coded in VHDL, Verilog, or any other hardware description language and the code may be stored in an electronic memory directly within the FPGA or CPLD, or as a separate electronic memory. Further, the memory 512 can be non-volatile, such as ROM, EPROM, EEPROM or FLASH memory. The memory 512 can also be volatile, such as static or dynamic RAM, and a processor, such as a microcontroller or microprocessor, can be provided to manage the electronic memory as well as the interaction between the FPGA or CPLD and the memory.

Alternatively, the CPU in the reconstruction device 514 can execute a computer program including a set of computer-readable instructions that perform the functions described herein, the program being stored in any of the above-described non-transitory electronic memories and/or a hard disk drive, CD, DVD, FLASH drive or any other known storage media. Further, the computer-readable instructions may be provided as a utility application, background daemon, or component of an operating system, or combination thereof, executing in conjunction with a processor, such as a Xenon processor from Intel of America or an Opteron processor from AMD of America and an operating system, such as Microsoft VISTA, UNIX, Solaris, LINUX, Apple, MAC-OS and other operating systems known to those skilled in the art. Further, CPU can be implemented as multiple processors cooperatively working in parallel to perform the instructions.

In one implementation, the reconstructed images can be displayed on a display 516. The display 516 can be an LCD display, CRT display, plasma display, OLED, LED or any other display known in the art.

The memory 512 can be a hard disk drive, CD-ROM drive, DVD drive, FLASH drive, RAM, ROM or any other electronic storage known in the art.

While certain implementations have been described, these implementations have been presented by way of example only, and are not intended to limit the teachings of this disclosure. Indeed, the novel methods, apparatuses and systems described herein may be embodied in a variety of other forms; furthermore, various omissions, substitutions and changes in the form of the methods, apparatuses and systems described herein may be made without departing from the spirit of this disclosure.

The invention claimed is:

1. An apparatus using filtered back-projection to approximate non-quadratic iterative computed tomography (CT) reconstruction, the apparatus comprising:
   circuitry configured to
   obtain projection data, the projection data representing intensity values of X-ray radiation detected at a plurality of detector elements;
   calculate, by applying filtered back-projection to the projection data, a first image;
   calculate a first version of a second image by applying a non-linear filter to the first image; and
   iteratively calculate second and higher versions of the second image by, for each iteration, high-pass filtering a previous version of the second image to obtain a filtered image and summing the filtered image with the first image to generate a summed image, and then applying the non-linear filter to the summed image to generate a current version of the second image.

2. The apparatus according to claim 1, wherein the circuitry is further configured to
   calculate the first version of the second image by applying the non-linear filter, wherein the non-linear filter includes a regularization-constraint method.

3. The apparatus according to claim 1, wherein the circuitry is further configured to high-pass filter the previous version of the second image using a high-pass filter that, in a spatial-frequency domain, is a polynomial of order k of an inverse of a magnitude of a spatial frequency, wherein k is a predefined positive integer.

4. The apparatus according to claim 1, wherein the circuitry is further configured to calculate the first image by
   performing one back-projection operation on the projection data to generate a back-projected image, and
   filtering the back-projected image using a modified ramp filter which, in a spatial-frequency domain, is a product between a ramp filter and a polynomial of order k of an inverse of the magnitude of a spatial frequency to generate the first image, wherein k is a predefined positive integer.

5. The apparatus according to claim 1, wherein the circuitry is further configured to calculate the first image by
   filtering the projection data using a modified ramp filter which, in a spatial-frequency domain, is a product between a ramp filter and a polynomial of order k of an inverse of a magnitude of a spatial frequency to generate filtered projection data, wherein k is a predefined positive integer, and
   performing one back-projection operation on the filtered projection data to generate the first image.

6. The apparatus according to claim 1, wherein the non-linear filter is one of an edge-preserving method, a Huber filter, a median filter, a bilateral filter, a guided filter, a non-local-means filter, and a non-quadratic regularizer.

7. The apparatus according to claim 1, wherein the non-linear filter is a guided filter that
   operates as a low-pass smoothing filter for pixels in a region having a standard deviation an order of magnitude less than a predefined threshold
   operates as a high-pass filter for pixels in a region having a standard deviation an order of magnitude greater than the predefined threshold, and
   operates as a half-magnitude low-pass smoothing filter for pixels in a region having a standard deviation within an order of magnitude of the predefined threshold.

8. The apparatus according to claim 1, wherein the circuitry is further configured to generate a final version of the second image by performing a predefined number of iterations of iteratively calculating the second and higher versions of the second image, wherein
   only one back-projection operation and no forward-projection operations are performed in all of the steps performed to generate the final version of the second image.

9. An apparatus, comprising:

an X-ray source radiating X-rays;

a plurality of detector elements each configured to detect the X-rays and generate projection data; and circuitry configured to calculate, by applying filtered back-projection to the projection data, a first image;

calculate a first version of a second image by applying a non-linear filter to the first image; and iteratively calculate second and higher versions of the second image by, for each iteration, high-pass filtering a previous version of the second image to obtain a filtered image and summing the filtered image with the first image to generate a summed image, and then applying the non-linear filter to the summed image to generate a current version of the second image.

10. The apparatus according to claim 9, wherein the circuitry is further configured to calculate the first version of the second image by applying the non-linear filter, wherein the non-linear filter includes a regularization-constraint method.

11. The apparatus according to claim 9, wherein the circuitry is further configured to high-pass filter the previous version of the second image using a high-pass filter that, in a spatial-frequency domain, is a polynomial of order k of an inverse of a magnitude of a spatial frequency, wherein k is a predefined positive integer.

12. The apparatus according to claim 9, wherein the circuitry is further configured to calculate the first image by performing one back-projection operation on the projection data to generate a back-projected image, and filtering the back-projected image using a modified ramp filter which, in a spatial-frequency domain, is a product between a ramp filter and a polynomial of order k of an inverse of the magnitude of a spatial frequency to generate the first image, wherein k is a predefined positive integer.

13. The apparatus according to claim 9, wherein the non-linear filter is one of an edge-preserving method, a Huber filter, a median filter, a bilateral filter, a guided filter, a non-local-means filter, and a non-quadratic regularizer.

14. The apparatus according to claim 9, wherein the non-linear filter is a guided filter that operates as a low-pass smoothing filter for pixels in a region having a standard deviation an order of magnitude less than a predefined threshold operates as a high-pass filter for pixels in a region having a standard deviation an order of magnitude greater than the predefined threshold, and operates as a half-magnitude low-pass smoothing filter for pixels in a region having a standard deviation within an order of magnitude of the predefined threshold.

15. The apparatus according to claim 9, wherein circuitry is further configured to generate a final version of the second image by performing a predefined number of iterations of iteratively calculating the second and higher versions of the second image, wherein only one back-projection operation and no forward-projection operations are performed in all of the steps performed to generate the final version of the second image.

16. A method of approximating non-quadratic iterative computed tomography (CT) reconstruction using filtered back-projection, the method comprising:

obtaining projection data, the projection data representing intensity values of X-ray radiation detected at a plurality of detector elements;

calculating, by applying filtered back-projection to the projection data, a first image;

calculating a first version of a second image by applying a non-linear filter to the first image; and iteratively calculating second and higher versions of the second image by, for each iteration, high-pass filtering a previous version of the second image to obtain a filtered image and summing the filtered image with the first image to generate a summed image, and then applying the non-linear filter to the summed image to generate a current version of the second image.

17. The method according to claim 16, wherein the calculating of the first version of the second image is performed by applying the non-linear filter, wherein the non-linear filter includes a regularization-constraint method.

18. The method according to claim 16, wherein the high-pass filtering of the previous version of the second image is performed by using a high-pass filter that, in a spatial-frequency domain, is a polynomial of order k of an inverse of a magnitude of a spatial frequency, wherein k is a predefined positive integer.

19. The method according to claim 16, wherein the non-linear filter is one of an edge-preserving method, a Huber filter, a median filter, a bilateral filter, a guided filter, a non-local-means filter, and a non-quadratic regularizer.

20. A non-transitory computer readable storage medium including executable instruction, wherein the instructions, when executed by circuitry, cause the circuitry to perform the method according to claim 16.

* * * * *